United States Patent [19]

Cook et al.

[11] 4,396,881
[45] Aug. 2, 1983

[54] MEANS INDICATING A CONDITION OF CHARGE IN A BATTERY CHARGER

[75] Inventors: Gary L. Cook; William P. Weller; John C. West, all of Bloomington, Minn.

[73] Assignee: Century Mfg. Co., Minneapolis, Minn.

[21] Appl. No.: 419,019

[22] Filed: Sep. 16, 1982

[51] Int. Cl.³ .............................................. H02J 7/00
[52] U.S. Cl. ...................................... 320/48; 340/636
[58] Field of Search ........................... 320/48; 340/636

[56] References Cited

U.S. PATENT DOCUMENTS 3,217,226 11/1965 Strain ..................................... 320/48
4,193,025 3/1980 Frailing et al. ....................... 320/48

FOREIGN PATENT DOCUMENTS 2742675 4/1979 Fed. Rep. of Germany ........ 320/48

Primary Examiner—William M. Shoop
Assistant Examiner—Anita M. Ault
Attorney, Agent, or Firm—Leo Gregory

[57] ABSTRACT

This invention relates to an electric battery charger for a storage battery such as an automotive battery in which the improvement consists of the visual display of such indicia that it informs the operator of the condition of charging present between the battery charger and the battery to be charged as to whether the battery is being properly charged, whether it can be charged and that it is fully charged.

4 Claims, 5 Drawing Figures

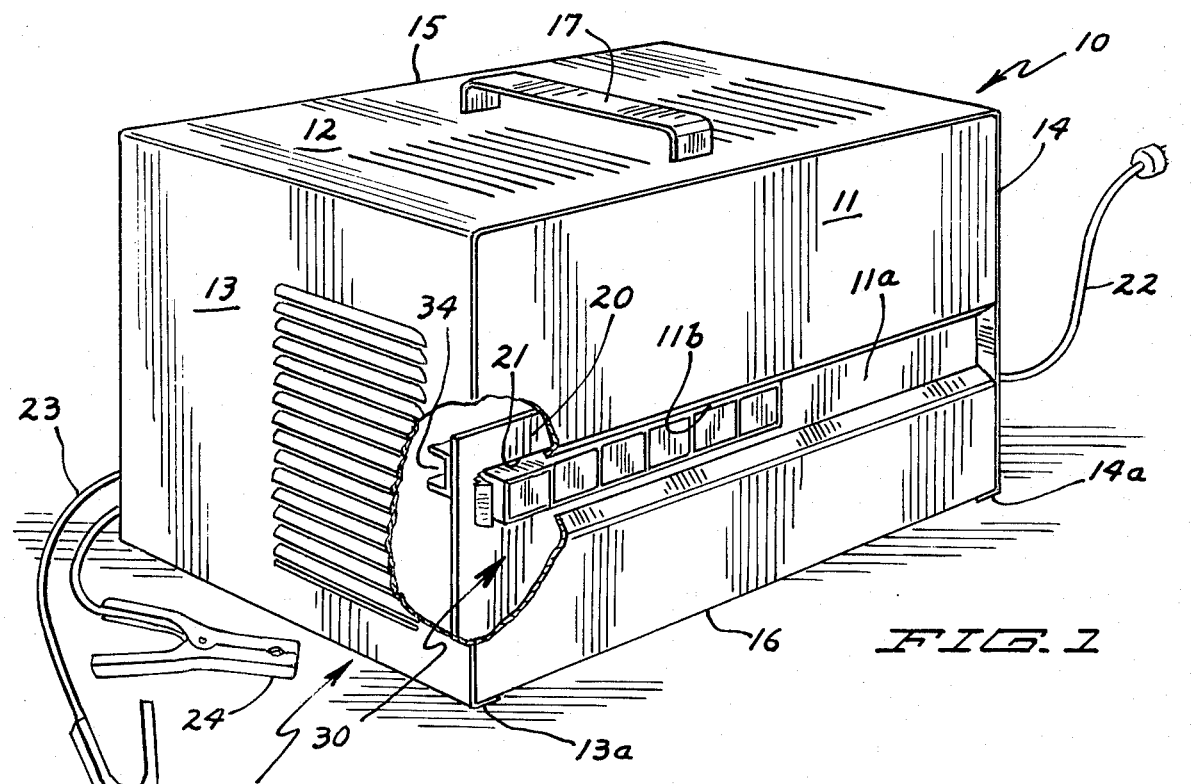
FIG. 1
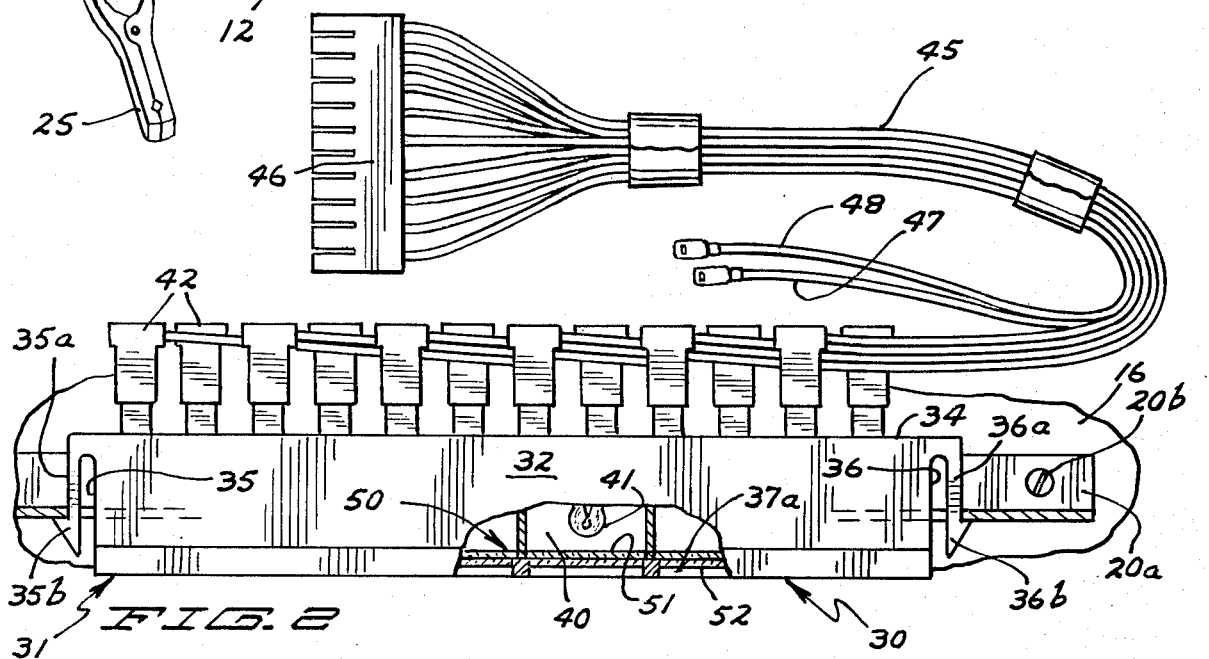
FIG. 2
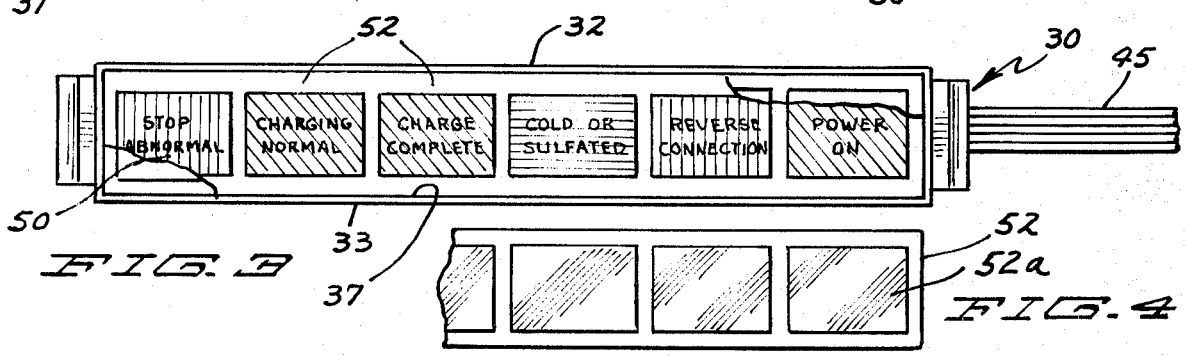
FIG. 3
FIG. 4

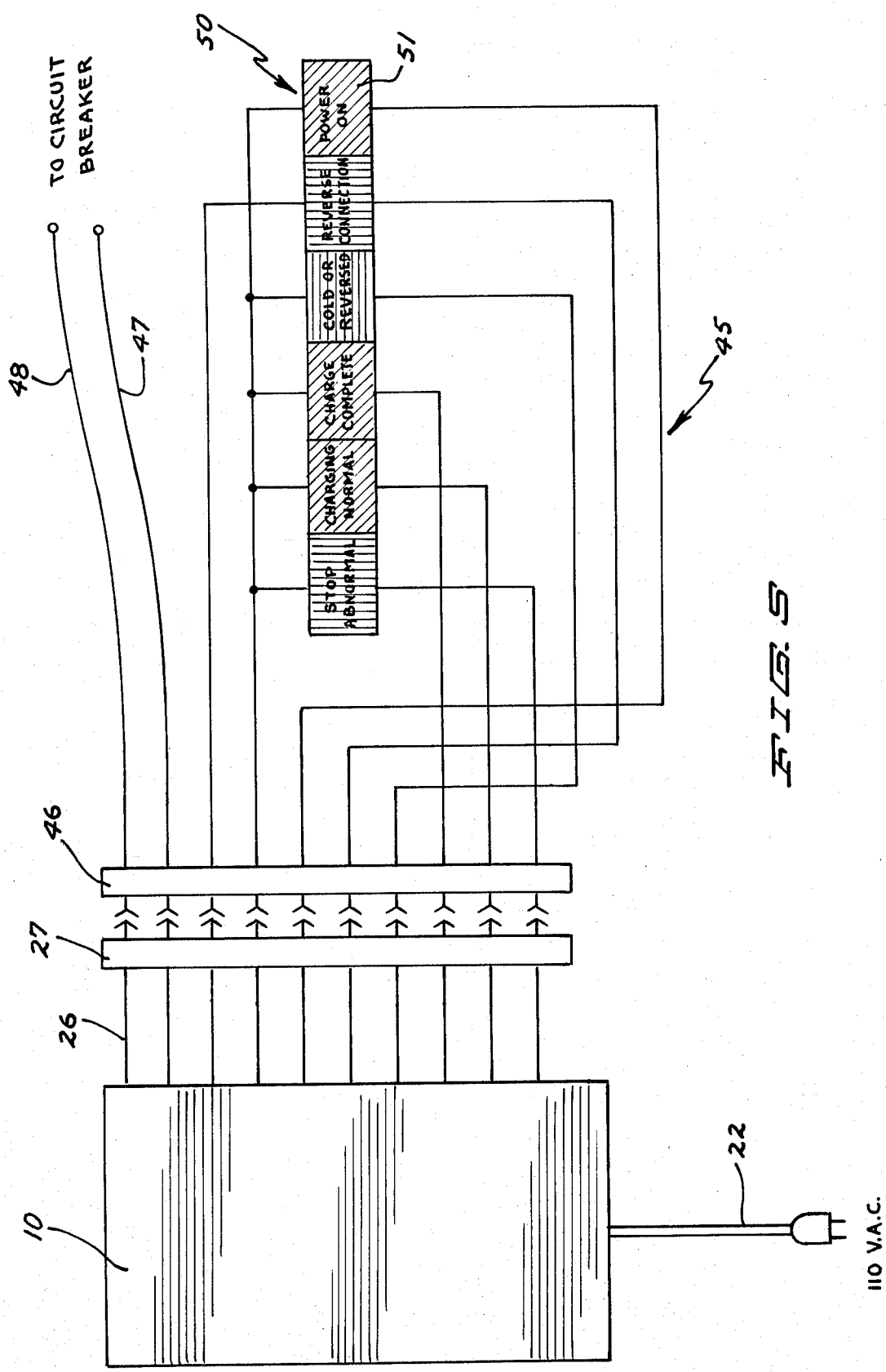

MEANS INDICATING A CONDITION OF CHARGE IN A BATTERY CHARGER

BACKGROUND OF THE INVENTION

1. Field of the Invention

This invention relates to a battery charger embodying indicia which explicitly displays information which describes the condition of charging a storage battery.

2. Description of the Prior Art

Battery chargers in the present practice of the art provide a dial ampere meter reading to indicate that the battery charger is energized and that it is in a charging mode. The dial reading requires expertise and experienced judgment to interpret. The meter does not as such describe the condition under which the battery is being charged or that the battery is fully charged. If there is an improper connection with a battery, it there is a short in the circuitry involved, or if the battery is sulfated, these all illustrate various problems which arise in connection with charging a battery and indicate the condition of charging and as to these, a dial reading gives no specific information. The meter generally indicates only that the charger is energized and the amperes being charged into the battery.

SUMMARY OF THE INVENTION

The invention herein represents a significant improvement in an electric battery charger and particularly in its application to automotive vehicle batteries.

For the ordinary person using a battery charger, the dial reading is not sufficiently informative to be of any benefit in indicating the nature of a problem which may be present having to do with the charging condition such as an improper connection, a short in the circuit, or a sulfated condition in the battery. The dial reading would indicate by the amperage indication of a problem condition being present but would not be informative in indicating the nature of the condition.

It is the purpose and object of this invention to provide indicia which would specifically describe the charging condition as being satisfactory or would indicate that an undesirable condition is present and describe the condition.

It is another object of this invention to provide a battery charger bearing indicia responsive to a charging condition and including a visual display of legends which describe specifically the nature of the condition of a charge.

More specifically it is an object of this invention to provide a battery charger which includes a display which is a part of the charging circuit and which is arranged and adapted to indicate visually in descriptive terms the nature of the condition of the charge and to specifically indicate the presence and nature of an undesirable charging condition and at the completion of a charge that the battery has been fully charged.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in perspective with a portion broken away;

FIG. 2 is a top plan view showing a detail of structure and has a portion broken away;

FIG. 3 is a view of a detail in front elevation;

FIG. 4 is a fragmentary portion of a detail in front elevation; and

FIG. 5 is a schematic wiring diagram.

DESCRIPTION OF A PREFERRED EMBODIMENT

Referring to the drawings, the battery charger embodying the invention herein is indicated generally at 10 and comprises a housing here shown to be substantially parallelepiped in form, having a front wall 11, a top wall 12, end walls 13 and 14, a back wall indicated at 15 and a bottom wall indicated at 16. The front, back and bottom walls are integral. The top and end walls are also integral with the end walls having right angled flanges 13a and 14a underlying the bottom wall and being suitably secured thereto as by metal screws not here shown. Secured to the top wall is a handle 17.

Said front wall has a recessed strip portion 11a thereacross, said strip portion having a cutout portion 11b forming an open slot or window.

Spaced inwardly of said front wall within said housing as shown through the broken away portion of said front wall in FIG. 1 is an inner vertical plate member 20 having an angled bottom flange 20a riveted as at 20b to the bottom wall 16 and having an elongated slot or cutout 21 corresponding to and in horizontal alignment with said cutout or slot 11b.

Running from said housing to connect the circuitry therein with a suitable power source is a cable 22. Also operatively connected with the circuitry of said battery charger is a cable 23 having as a terminal a pair of battery clamps 24 and 25 to be secured to the poles of a battery to be charged.

The circuitry of the battery charger 10 is conventional and well known in the art and is not here shown. The circuitry indicated by the reference numeral 26 is intended to be a schematic indication of the circuitry included in the circuitry of said battery charger and is particularly designed to sense conditions of charge in connection with charging a battery. These conditions are referred to and are further described hereinafter.

Given the conditions to be sensed, the particular detail wiring of the circuitry 26 also is well known in the art and is not here shown but is alluded to hereinafter in connection with the legend bearing element to be described.

The specific novelty which comprises the invention herein is a legend or indicia bearing element 30 formed as an insert to be positioned for display through said slot 11b. Said element 30 as will be described is adapted to inform the operator clearly and precisely the condition of charging of a battery being charged.

Said element 30 as here presented comprises an elongated lamp housing 31 substantially parallelepiped in form having a relatively small transverse cross section dimension and has a top wall 32, a bottom wall 33, a back wall 34, end walls 35 and 36 and an open front wall 37. Said front wall has a small peripheral right angled inset flange 37a.

Projecting outwardly of each of said end walls 35 and 36 spaced outwardly therefrom and being substantially coextensive therewith are yielding holding members 35a and 36a having adjacent the ends thereof outwardly projecting ears 35b and 36b.

Said housing is disposed through said slot 21 retained by said ears 35b and 36b as shown in FIG. 2 and said housing faces through said slot 11b and is positioned to be flush with said slot.

Formed within said housing 31 and opening upon the front wall thereof as here shown are lamp compartments here indicated to be six in number as represented by the compartment 40 and mounted therein are conventional lamps as represented by the lamp 41.

Extending rearwardly through the back wall 34 for each of the respective lamps are pairs of electrical contacts as represented by the contacts 42 which are respectively in circuit with the circuitry 26 of said battery charger by means of a cable harness 45, the same to be further described, said cable harness terminating in a jack plug 46 for removable connection with said terminal receptacle 27.

As will be noted in the drawings, said cable harness in addition to the wires for particularly connecting said lamps 41 carries wires 47 and 48 which are in circuit between a power source and a circuit breaker (not shown) and in the event of a reverse connection or a short, the charger will be cut off from its power source.

Seated within said inset flange 11b is a legend strip 50 bearing the indicia indicating the condition of a charge in charging a battery. Said strip has frames such as frame 51 corresponding to the compartments 40 and said frames respectively bearing the following legends and colors, namely, "STOP ABNORMAL"—red, "CHARGING NORMAL"—green, "CHARGE COMPLETE"—green, "COLD OR SULFATED"—blue, "REVERSE CONNECTION"—red and "POWER ON"—green.

Said strip 50, which is also referred to herein as an alert strip, will be made of a suitable translucent material onto which said legends and colors may be silk-screened. Said strip is indicated in FIGS. 3 and 5.

Overlying said strip 50 is a protective frame strip 52 having translucent panels 52a made as of a suitable plastic material through which when said lamps are energized, said legends and colors will readily show. Said strip 52 will be sized to snap securely into the recess formed by said angled flange 37a. Said panels 52a correspond to the compartment openings 40.

OPERATION

The battery charger herein is indicated as being a 12 volt battery charger for use with storage batteries.

To charge a battery, the clamps 24 and 25 will first be secured to the appropriate battery poles and the cable 22 will then be plugged into a suitable 110 AC power source. In the event the battery charger is energized prior to being hooked up to a battery, the signal lamp for the alert legend "STOP ABNORMAL" will be energized to light up as a warning. If the battery charger is plugged into a power source before being hooked up to a battery, the battery clamps 24 and 25 may spark upon being connected to the battery poles and thus create a hazard condition.

When the battery charger is connected to a battery and is first energized by being plugged in to a power source, the "POWER ON" legend will light up and also to indicate that the element 30 is operational, the lamps lighting up the first four alert signals reading from left to right in FIG. 4 will be energized and will light up very briefly.

In the event the battery charger is hooked up to a 6 volt battery or if the battery has a shorted cell or if the clamps are shorted, the lamp for the legend "STOP ABNORMAL" will light up. In the case of a reverse connection, the alert legend "REVERSE CONNECTION" will light up and the circuit breaker in circuit therewith will cut off the power source as otherwise the battery would become drained.

In the event of a cold or sulfated battery, the corresponding alert legend will be lighted to indicate that it will take a relatively longer period of time to charge the battery and if the alert signal remains lighted for a sufficient extended period of time, it will indicate that the battery is unable to accept a charge.

When a battery has become fully charged, the alert legend "CHARGE COMPLETE" will become lighted.

The phrase "condition of charge" as used herein relates to the conditions indicated by the indicia of the legend strip 50 as has been described.

Referring to FIG. 5, the cable harness 45 is not described in detail. The wiring in connection with the circuitry 26 will be such as to carry out the operation above described and this merely entails conventional wiring. The presence, structure and operation of the legend or alert signals represent the element of novelty and the improvement herein in battery chargers.

Thus it is seen that in the use of the battery charger herein, the operator is well informed in an understandable manner and in the event of the presence of an improper condition, this is clearly made known to him.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A battery charger sensing conditions of charge in charging a storage battery such as an automotive battery, having in combination
    a battery charger comprising a housing,
    a legend bearing element embodying specific legends which respectively indicate conditions of charge with reference to charging a battery,
    circuitry which senses conditions of charge being included in the circuitry of said battery charger,
    means connecting said first mentioned circuitry with said legend bearing element whereby specific conditions sensed relate to corresponding legends,
    said element comprising a housing,
    means in said first mentioned housing supporting said element,
    an opening in a wall of said first mentioned housing displaying said legends of said element,
    said element housing having an open wall,
    a recess forming the inner periphery of said open wall,
    a legend strip bearing said legends disposed in said recess,
    a frame member overlying said legend strip and being pressure fit into said recess, and
    said framework having individual frames therein separating said specific legends.

2. The structure of claim 1, wherein
    said last mentioned means comprises an upstanding plate member having an opening therein receiving said element housing, and said element housing having yielding means disposed under compression into said last mentioned opening.

3. A battery charger adapted to sense conditions of charge in charging a battery, such as an automotive battery, having in combination a housing comprising said battery charger, circuitry which senses conditions of charge of a battery included in the circuitry of said battery charger, a legend bearing element having the legends thereof each indicating a condition of said charge in charging a battery, said legends including means adapted to be energized, means putting said legends into circuit with said circuitry which senses said conditions of charge, said last mentioned circuitry responsive to the occurrence of a condition of charge energizes said last mentioned means of a corresponding legend alerting attention to such condition, an opening in a wall of said housing accommodating said element, said opening receiving therein said element under a holding pressure, each of said legends being displayed separately, and a lighting element in connection with each of said legends.

4. A battery charger adapted to sense conditions of charge in charging a battery, such as an automotive battery, having in combination a housing comprising said battery charger, circuitry which senses conditions of charge of a battery included in the circuit of said battery charger, a legend bearing element having the legends thereof each indicating a condition of said charge in charging a battery, means mounting said element carried with said housing, said legends including means adapted to be energized, means putting said last mentioned means into circuit with said circuitry, said circuitry responsive to the occurrence of a condition of charge energizes said means of a corresponding legend to energize said legend, said mounting means accommodating said element receiving said element under a holding pressure, and each of said legends being displayed separately.

* * * * *